United States Patent
Miyashima et al.

(10) Patent No.: US 11,781,234 B2
(45) Date of Patent: *Oct. 10, 2023

(54) COPPER ALLOY PLATE, PLATING FILM-ATTACHED COPPER ALLOY PLATE, AND METHODS RESPECTIVELY FOR MANUFACTURING THESE PRODUCTS

(71) Applicant: MITSUBISHI MATERIALS CORPORATION, Tokyo (JP)

(72) Inventors: Naoki Miyashima, Aizuwakamatsu (JP); Kazunari Maki, Aizuwakamatsu (JP); Shinichi Funaki, Aizuwakamatsu (JP); Kenji Kubota, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 181 days.

This patent is subject to a terminal disclaimer.

(21) Appl. No.: 17/416,551

(22) PCT Filed: Dec. 18, 2019

(86) PCT No.: PCT/JP2019/049547
§ 371 (c)(1),
(2) Date: Jun. 21, 2021

(87) PCT Pub. No.: WO2020/137726
PCT Pub. Date: Jul. 2, 2020

(65) Prior Publication Data
US 2022/0081738 A1 Mar. 17, 2022

(30) Foreign Application Priority Data

Dec. 26, 2018 (JP) .................................. 2018-243431
Jun. 20, 2019 (JP) .................................. 2019-114466

(51) Int. Cl.
*C25D 5/10* (2006.01)
*C22C 9/00* (2006.01)
*C25D 5/50* (2006.01)

(52) U.S. Cl.
CPC .................. *C25D 5/10* (2013.01); *C22C 9/00* (2013.01); *C25D 5/505* (2013.01); *Y10T 428/12903* (2015.01)

(58) Field of Classification Search
None
See application file for complete search history.

(56) References Cited

U.S. PATENT DOCUMENTS 5,667,752 A 9/1997 Suzuki et al.
9,255,310 B2 2/2016 Sakurai et al.
(Continued)

FOREIGN PATENT DOCUMENTS

CN 103805801 A 5/2014
CN 108431257 A 8/2018
(Continued)

OTHER PUBLICATIONS

First Examination Report (FER) dated Dec. 22, 2022, issued for the Indian Patent Application No. 202117031992.
(Continued)

*Primary Examiner* — Seth Dumbris
(74) *Attorney, Agent, or Firm* — Locke Lord LLP

(57) ABSTRACT

A copper alloy plate including 0.3 mass % or more and 1.2 mass % or less of Mg, 0.001 mass % or more and 0.2 mass % or less of P, and the balance Cu with inevitable impurities in a thickness center portion in a plate thickness direction; Mg concentration on a plate surface is 30% or less of bulk Mg concentration at the thickness center portion; a surface layer part having a depth from the plate surface to where it is 90% of the bulk Mg concentration is provided; and in the
(Continued)

surface layer part, the Mg concentration increases from the plate surface toward the thickness center portion with a concentration gradient 1.8 mass %/μm or more and 50 mass %/μm or less.

8 Claims, 1 Drawing Sheet

(56) References Cited

U.S. PATENT DOCUMENTS

| | | |
|---|---|---|
| 2003/0129441 A1 | 7/2003 | Hara et al. |
| 2004/0209112 A1 | 10/2004 | Hara et al. |
| 2008/0090096 A1 | 4/2008 | Suzuki et al. |
| 2010/0304016 A1 | 12/2010 | Suzuki et al. |
| 2019/0048449 A1 | 2/2019 | Matsunaga et al. |
| 2020/0076103 A1 | 3/2020 | Narieda et al. |
| 2021/0017628 A1 | 1/2021 | Matsunaga et al. |
| 2022/0145424 A1* | 5/2022 | Miyashima ............ B32B 15/20 |
| 2023/0047984 A1* | 2/2023 | Akisaka ................ C23F 17/00 |

FOREIGN PATENT DOCUMENTS

| | | |
|---|---|---|
| JP | H09-157774 A | 6/1997 |
| JP | 2004-68026 A | 3/2004 |
| JP | 2006-183068 A | 7/2006 |
| JP | 2008-285729 A | 11/2008 |
| JP | 4516154 B1 | 8/2010 |
| JP | 2012-007231 A | 1/2012 |
| JP | 2013-218866 A | 10/2013 |
| JP | 2014-047378 A | 3/2014 |
| JP | 2014-95107 A | 5/2014 |
| JP | 2015-133306 A | 7/2015 |
| JP | 5908796 B2 | 4/2016 |
| JP | 2016-166397 A | 9/2016 |
| JP | 2018-90875 A | 6/2018 |
| JP | 2018-159125 A | 10/2018 |
| TW | 201807204 A | 3/2018 |

OTHER PUBLICATIONS

Search Report of the Office Action dated Jun. 5, 2023, issued for the TAIWAN Patent Application No. 108147320.

* cited by examiner

COPPER ALLOY PLATE, PLATING FILM-ATTACHED COPPER ALLOY PLATE, AND METHODS RESPECTIVELY FOR MANUFACTURING THESE PRODUCTS

BACKGROUND OF THE INVENTION

Technical Field

The present invention relates to a copper alloy plate containing Mg and P, a plating film-attached copper alloy plate formed by plating on the copper alloy plate, and methods of manufacturing the same. Priority is claimed on Japanese Patent Application No. 2018-243431, filed Dec. 26, 2018, and Japanese Patent Application No. 2019-114466, filed Jun. 20, 2019, the content of which is incorporated herein by reference.

Background Art

In recent years, due to the miniaturization, thinning and weight reduction such as portable terminals, terminals and connector components used therein are smaller in size and narrower in inter-electrode pitch. In electronic equipment used in the periphery of an automobile engine, reliability is required under severe conditions at high temperature. Accompanied by these, for necessity of maintaining reliability of the electronic connection, strength, electrical conductivity, a spring deflection limit, a stress relaxation characteristic, bending workability, fatigue resistance and the like are required further to be improved, so that a copper alloy plate containing Mg and P shown in Patent Documents 1 to 4 is used.

Patent Document 1 discloses a copper alloy thin plate for manufacturing connectors formed of copper alloy having a composition of copper alloy containing Mg:0.3 to 2% by weight, P:0.001 to 0.02% by weight, C:0.0002 to 0.0013% by weight, oxygen:0.0002 to 0.001% by weight, and the balance Cu and inevitable impurities and a structure in which oxide particles containing minute Mg with a diameter 0.3 μm or less are evenly diffused in a base.

Patent Document 2 discloses a copper alloy strip material having a composition Mg:0.3 to 2%, P:0.001 to 0.1% by mass and a balance Cu and inevitable impurities and a method of manufacturing the same. In the Cu—Mg—P-based copper alloy used in the copper alloy strip material, measuring orientations of all pixels in the measuring area on a surface of the copper alloy strip material by the EBSD method by a scanning electron microscope with a back scattering electron diffraction pattern system, and regarding a boundary in which the misorientation between the adjacent pixels is 5° or more as a crystal boundary, an area rate of crystal grains having average misorientation less than 4° between all pixels in a crystal grain is 45 to 55% of a measuring area. The copper alloy strip material has a tensile strength of 641 to 708 N/mm² and a spring deflection limit of 472 to 503 N/m²; the tensile strength and the spring deflection limit are balanced at a high level.

Patent Document 5 discloses a copper alloy strip material having composition of by mass percentage, Mg: 0.3 to 2%, P: 0.001 to 0.1%, and the balance of Cu and inevitable impurities and a manufacturing method thereof. In the copper alloy strip material, when orientation of all pixel in a measuring area on a surface of the copper alloy strip material is measured with a step size 0.5 μm by the EBSD method using a scanning electron microscope with a back-scattering electron diffraction pattern system, and considering a boundary with 5° or more of misorientation between adjacent pixels as a crystal grain boundary, an area rate of crystal grains in which average misorientation between all pixels in the crystal grain is less than 4° is 45 to 55% of the measuring area and an area average GAM of the crystal grains in the measuring area is 2.2 to 3.0°. The copper alloy strip material has tensile strength of 641 to 708 N/mm², a spring deflection limit of 472 to 503 N/mm², and fatigue limit under completely reversed plane bending of 300 to 350 N/mm² at repeated time of $1 \times 10^6$.

The present applicant provided "MSP1" as Mg—P-type copper alloy having excellent strength, electric conductivity, stress relaxation resistance performance, and the like. MSP1 is broadly used as terminals for vehicles, relay movable pieces, spring material for contacts, bus bar modules, lithium-ion batteries, fuse terminals, miniature switches, junction boxes, relay boxes, contact breakers, battery terminals, and the like.

With the aim of further reducing friction coefficient (reducing insertion force) for such copper alloy plate, Patent Document 4 proposes a Cu—Mg—P-type copper alloy Sn-plated plate. The copper alloy Sn-plated plate is provided with a copper alloy plate having a composition of 0.2 to 1.2% by mass of Mg, 0.001 to 0.2% by mass of P, and the balance Cu and inevitable impurities as a base material 2, and a plating-film layer 5 after reflowing having an Sn phase 6 with a thickness of 0.3 to 0.8 μm, an Sn—Cu alloy phase 7 with a thickness of 0.3 to 0.8 μm, and a Cu phase 8 with a thickness of 0 to 0.3 μm. In the copper alloy Sn-plated plate, a ratio (A/B) of Mg concentration (A) of the Sn phase 6 and Mg concentration (B) of the base material 2 is 0.005 to 0.05; and a ratio (C/B) of the Mg concentration (B) of the base material 2 and Mg concentration (C) at a boundary surface layer 4 with a thickness of 0.2 to 0.6 μm between the plating-film layer 5 and the base material 2 is 0.1 to 0.3.

PRIOR ART DOCUMENTS

Patent Documents

Patent Document 1: Japanese Unexamined Patent Application, First Publication No. H09-157774
Patent Document 2: Japanese Patent Application, Publication No. 4516154
Patent Document 3: Japanese Unexamined Patent Application, First Publication No. 2012-007231
Patent Document 4: Japanese Unexamined Patent Application, First Publication No. 2014-047378

SUMMARY OF INVENTION

Technical Problem

Copper alloy containing Mg is balanced on fine mechanical strength and excellent electrical conductivity by added Mg; on the other, solder wettability and electrical connection reliability may be deteriorated. Particularly, in a case in which Sn plating and then heating and melting treatment is performed on the base material in order to further improve the electrical connection reliability, the solder wettability is remarkably deteriorated, and adhesiveness of the plating film may also be deteriorated. In Patent Document 4, in a copper alloy Sn-plated plate, Mg concentration in an Sn phase on a surface of a plating film and Mg concentration in a boundary surface layer between a plated film layer and a base material are limited in a prescribed range; however, further improvement is required.

In the present invention, achieved in consideration of the above circumstances, an object is to improve solder wettability and adhesiveness of a soldering film in a copper alloy plate containing Mg.

Solution to Problem

In view of these circumstances, the inventors have found that the deterioration in solder wettability is caused by the oxidation of Mg present on the surface of the base material; particularly, when the base material is subjected to Sn plating and then heating and melting treatment, the solder wettability is remarkably deteriorated resulting from the diffusion of Mg to reach the surface of the plating film by heating. In this case, the base material made of copper alloy is alloyed with Sn, so that Mg is taken into the Sn—Cu alloy layer and the Sn layer, and Mg is moreover easy to be diffused to the surface of the plating film.

Since Mg is an active element, Mg on the surface of the copper alloy plate before plating becomes oxide Mg immediately. In a case in which the copper alloy plate in which many Mg presents on the surface is plated, since the oxide Mg on the surface of the base material and metal in the plating film cannot form metallic bond, the adhesiveness of the plating film is deteriorated, and it is easy to be peeled by heating and the like.

Under these findings, the present invention intends improvement of the solder wettability and improvement of adhesiveness by appropriately controlling the Mg concentration in the surface layer part of the copper alloy plate, the surface of the copper alloy plate is prevented from oxidizing, and the Mg concentration in the plating film is reduced even when the plating film is formed.

A copper alloy plate of the present invention is a copper alloy plate including 0.3 mass % or more and 1.2 mass % or less of Mg, 0.001 mass % or more and 0.2 mass % or less of P, and the balance Cu with inevitable impurities in a thickness center portion in a plate thickness direction. In this copper alloy plate, surface Mg concentration on a plate surface is 30% or less of bulk Mg concentration at the thickness center portion; and in a surface layer part from the plate surface to a depth in which Mg concentration is 90% of the bulk Mg concentration, the Mg concentration increases from the plate surface toward the thickness center portion with a concentration gradient 1.8 mass %/μm or more and 50 mass %/μm or less.

In other words, the copper alloy plate of the present invention is a copper alloy plate having a surface layer part having Mg concentration gradient from a plate surface in a plate thickness direction and an inner plate part including a thickness center portion in which Mg concentration is substantially uniform, in which components in the thickness center part are Mg:0.3 mass % or more and 1.2 mass % or less, P: 0.001 mass % or more and 0.2 mass % or less, and the balance: Cu and inevitable impurities; surface Mg concentration at the plate surface is 0% or more and 30% or less of the bulk Mg concentration at the thickness center portion; and the Mg concentration in the surface layer part increases with concentration gradient of 1.8 mass %/μm or more and 50 mass %/μm or less from the plate surface toward the thickness center portion, and highest at the deepest part of the surface layer part, 90% of the bulk Mg concentration.

In this copper alloy plate, oxide Mg is not easily generated on the plate surface since the surface Mg concentration is not more than 30% of the bulk Mg concentration, so that the electric connection reliability is excellent, and it can be utilized as a contact point without plating treatment or the like. In a case in which the plating film is formed later and heat treated, Mg can be prevented from diffusing into the plating film. Accordingly, the solder wettability is excellent and the plating film can be prevented from peeling.

In view of preventing oxidization at the plate surface and reducing the diffusion of Mg to the plating film, it is preferable that the surface Mg concentration be 30% or less of the bulk Mg concentration. Moreover, the surface layer part in which the Mg concentration gradient suddenly changes is thin: in other words, the thickness of the surface layer part having the Mg concentration gradient is appropriate, so that the diffusion of Mg is prevented and the excellent mechanical characteristic of copper alloy is maintained.

In the surface layer part, if the Mg concentration gradient from the plate surface is less than 1.8 mass %/μm, the characteristic of reducing Mg diffusion to the plating film saturate; on the other, the surface layer part where the Mg concentration is low is thick and the desired Mg concentration cannot be obtained to considerable depth; so that the characteristic as the Mg containing copper alloy plate is spoiled.

On the other, if the Mg concentration gradient exceeds 50 mass %/μm, the surface layer part where the Mg concentration is low is too thin comparing with the thickness center portion, so that the effect of preventing Mg diffusion is poor.

As one aspect of the copper alloy plate according to the present invention, the thickness of the surface layer part is 0.6 μm or less. If the thickness of the surface layer part exceeds 0.6 μm, the ratio of an area in which Mg content amount is small is large in the whole plate thickness, so that the mechanical characteristic as the Mg containing copper alloy may be deteriorated. This deterioration of the characteristic is particularly remarkable if the plate thickness is small.

A plating film-attached copper alloy plate of the present invention is provided with a plating film formed on the surface layer part of the copper alloy plate.

The plating film-attached copper alloy plate is excellent in the adhesiveness of the plating film because the surface Mg concentration of the copper alloy plate is small and oxide Mg is small; moreover, Mg diffused into the plating film can be reduced and the solder wettability is excellent.

As one aspect of the plating film-attached copper alloy plate according to the present invention, average concentration of Mg in the plating film is 10% or less of the bulk Mg concentration.

In this plating film-attached copper alloy plate, if the average concentration of Mg in the plating film exceeds 10% of the bulk Mg concentration, the influence on the contact resistance by the surface diffusion of Mg is large.

As another aspect of the plating film-attached copper alloy plate according to the present invention, the plating film is formed of one or more layers selected from tin, copper, zinc, nickel, gold, silver, palladium, and alloy thereof. If the plating film is these metal or alloy, the plating film-attached copper alloy plate has an excellent electrical connection reliability, so it can be appropriately used as a connector terminal.

A method of manufacturing a copper alloy plate includes an Mg condense treatment forming the concentration gradient of Mg in a plate thickness direction and forming an Mg condense part in which Mg is condensed by diffusing Mg in an Mg containing copper alloy plate toward a surface of the Mg containing copper alloy plate and a surface part remove treatment forming the surface layer part by removing the Mg condense part.

By this method of manufacturing, the surface layer part formed by removing the Mg condense part is low in the Mg concentration comparing with the thickness center portion, so that generation of an oxide film is small on the plate surface and the solder wettability is excellent.

In the method of manufacturing the plating film-attached copper alloy plate of the present invention, the plating film is formed by electrolytic plating treatment with current density 0.1 A/dm$^2$ or more and 60 A/dm$^2$. If the current density for the electrolytic plating treatment is less than 0.1 A/dm$^2$, film formation speed is slow and it is not economical. If the current density exceeds 60 A/dm$^2$, it exceeds diffusion-limited current density and a film without defect cannot be formed.

For example, in a case in which the tin plating film is formed by performing the electrolytic plating treatment, in order to reduce whiskers, reflow treatment may be performed after the electrolytic plating treatment. That is, as one aspect of the method of manufacturing the plating film-attached copper alloy plate according to the present invention, after the electrolytic plating treatment forming the plating film containing tin, reflow treatment is performed with heating peak temperature 230° C. or more and 330° C. or less; desirably the heating peak temperature be 300° C. or less, and the heating time at the heating peak temperature is not less than 0.5 second and not more than 30 seconds; desirably 1 second or more and 20 seconds or less.

If the peak heating temperature in the reflowing is less than 230° C. or the heating time is less than 0.5 second, tin is not melted again and the effect of reducing the whiskers cannot be obtained. If the heating temperature exceeds 330° C. or the heating time exceeds 30 seconds, Mg diffusion to the surface of the plating film advances by excessive heating and the solder wettability is deteriorated.

Advantageous Effects of Invention

According to the present invention, oxidization on a surface of a plate of a copper alloy plate is reduced; electrical connection reliability and solder wettability on a surface of the plate are improved; Mg concentration is reduced in a plating film even in a case in which the plating film is formed; and improvement of solder wettability on a surface of the plating film and improvement of adhesiveness of the plating film and the copper alloy plate can be developed.

DESCRIPTION OF EMBODIMENTS

Figure 1:
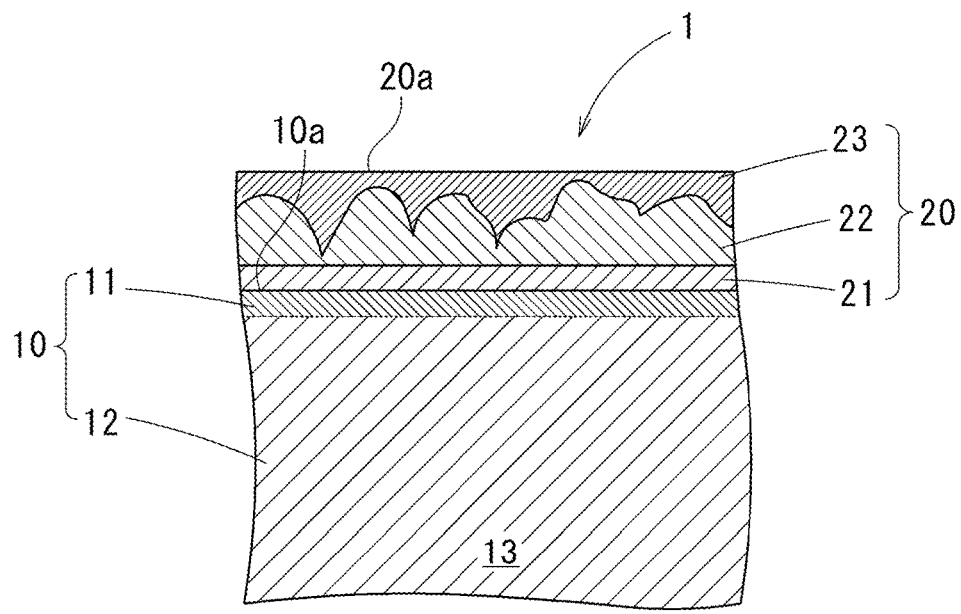
FIG. 1 It is a cross sectional view schematically showing one embodiment of a plating film-attached copper alloy plate of the present invention.

An embodiment of the present invention will be explained. In a plating film-attached copper alloy plate 1 of this embodiment, on a plate surface 10a of a copper alloy plate 10 containing Mg and P, a plating film 20 formed of a Cu layer 21, an Sn—Cu alloy layer 22, and an Sn layer 23 are layered in order is formed.

[Copper Alloy Plate]

A thickness center portion 13 of the copper alloy plate 10 is formed from not less than 0.3% by mass and not more than 1.2% by mass of Mg and not less than 0.001% by mass and not more than 0.2% by mass of P, and the balance Cu with inevitable impurities.

(Mg, P)

Mg is solid-dissolved in a base of Cu and improves strength without deteriorating electrical conductivity. P has a deoxidizing action at the time of melting and casting, and improves the strength in a state of co-existence with Mg. Containing Mg and P in the above-described range, the characteristic thereof can be shown in the copper alloy plate 10.

Regarding content of Mg in the copper alloy plate 10, Mg concentration in the thickness center portion 13 (hereinafter, "bulk Mg concentration") where Mg concentration is stable is not less than 0.3% by mass and not more than 1.2% by mass as above-mentioned (preferably not less than 0.5% by mass); however, Mg concentration on the plate surface 10a (hereinafter, "surface Mg concentration") is not more than 30% (not less than 0%) of the bulk Mg concentration.

In the copper alloy plate 10, since the surface Mg concentration is not more than 30% of the bulk Mg concentration, oxidized Mg is not easily generated on the plate surface 10a and Mg is prevented from diffusing into the plating film 20 even in a case thereafter plated and heating treated. Accordingly, the solder wettability is excellent and peeling of the plating film 20 can be prevented.

In view of preventing oxidation of the plate surface 10a and inhibiting Mg diffusion to the plating film 20, it is sufficient that the plate surface 10a does not contain Mg (the surface Mg concentration is 0% of the bulk Mg concentration); however, if the surface Mg concentration is not more than 30% of the bulk Mg concentration, it is preferable because the characteristic as Mg-containing copper alloy appears on the plate surface 10a to some extent. The surface Mg concentration is more preferably not more than 20% of the bulk Mg concentration; more preferably not more than 15%.

The content of Mg in the copper alloy plate 10 has concentration gradient of 1.8 mass %/μm to 50 mass %/μm (inclusive) from the plate surface 10a toward a center in the plate thickness. A surface layer part 11 is the extent from the plate surface 10a to where the Mg concentration is 90% of the bulk Mg concentration along the concentration gradient.

If the concentration gradient of Mg in the copper alloy plate 10 along the plate thickness direction is less than 1.8 mass %/μm, desired Mg concentration cannot be obtained to a considerable depth, so that characteristic of Mg-containing copper alloy plate is deteriorated. On the other, if it exceeds 50 mass %/μm, an effect of reducing diffusion of Mg is poor. An upper limit of the concentration gradient of Mg is preferably not more than 30 mass %/μm; more preferably not more than 17.5 mass %/μm.

The thickness of the surface layer part 11 is preferably not more than 0.6 μm; more preferably not more than 0.5 μm; even more preferably not more than 0.45 μm. In the copper alloy plate 10, with regard to the surface layer part 11, an inner part than the surface layer part 11 is an inner plate part 12.

Figure 2:
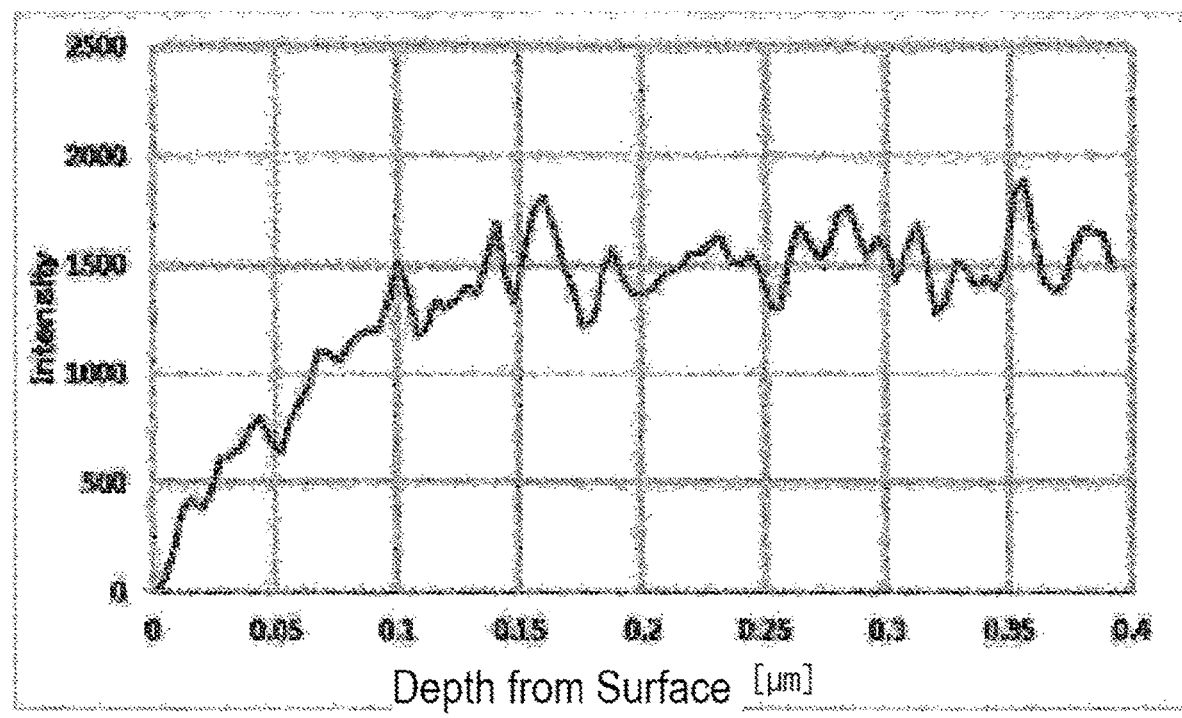
FIG. 2 It is an analyzation drawing of Mg component in a depth direction of the copper alloy plate, measured by XPS.

FIG. 2 is a graph showing a result of analyzing Mg component in the copper alloy plate 10 in the depth direction. A sample obtained by film-thinning the copper alloy plate 10 in the plate thickness direction was analyzed by X-ray photoelectron spectroscopy (XPS). In FIG. 2, the transverse axis represents a depth (distance) from the plate surface 10a; and the vertical axis represents the XPS spectral intensity, i.e., the Mg concentration. Arithmetical mean of a maximum value and a minimum value of the Mg concentration at the thickness center portion 13 where the Mg concentration is stable is the bulk Mg concentration. A depth from the plate surface 10a to a position where the Mg concentration changing toward the thickness center portion 13 reaches 90% of the bulk Mg concentration is the thickness of the surface layer part 11.

(Component Other than Mg and P)

The copper alloy plate 10 may further contain 0.0002 to 0.0013 mass % of C and 0.0002 to 0.001 mass % of oxygen.

C is an element extremely hard to enter pure copper; however, if copper alloy contains a very small quantity, there is an effect of reducing large growth of oxide containing Mg. However, if the content of C is less than 0.0002 mass %, the effect of reducing the growth of the oxide containing Mg is not sufficient. On the other, it is not appropriate if the content of C exceeds 0.0013 mass %, it exceeds the solid solution limit and precipitates on crystal boundaries, so that intercrystalline cracks are generated and the copper alloy plate 10 is embrittled; and cracks may be generated while bending working. More preferable range of the content of C is 0.0003 to 0.0010 mass %.

Oxygen make oxide with Mg. If minute and small amount of oxide containing Mg exists in the copper alloy plate 10, it is efficient for reducing friction wear of a die for punching out the copper alloy plate 10 for example; however, if the content of oxygen is less than 0.0002 mass %, the effect of reducing the friction wear is not sufficient. On the other, it is not appropriate if the content of oxygen exceeds 0.001 mass %, because oxide containing Mg largely grows. The range of the content of oxygen is more preferably 0.0003 to 0.0008 mass %.

Moreover, 0.001 to 0.03 mass % of Zr may be contained in the copper alloy plate 10. Tensile strength and the spring deflection limit of the copper alloy plate 10 is improved by adding 0.001 to 0.03 mass % of Zr: however, the effect cannot be expected out of the addition range.

[Plating Film]

The plating film 20 is formed on the plate surface 10a of the copper alloy plate 10 from the Cu layer 21 with a thickness 0 μm to 1 μm, the Sn—Cu alloy layer 22 with a thickness 0.1 μm to 1.5 μm, and the Sn layer 23 with a thickness 0.1 μm to 3.0 μm, in this order.

If the thickness of the Cu layer 21 exceeds 1 μm, thermal stress generated inside the plating film 20 is high when it is heated and the plating film 20 may be peeled off. There is a case in which the Cu layer 21 does not exist.

The Sn—Cu alloy layer 22 is hard but the strength may be deteriorated if the thickness is less than 0.1 μm because the effect of reducing an insertion force when used as a connector is weakened; if the thickness exceeds 1.5 μm, the plating film 20 may be peeled off because the thermal stress in the plating film 20 is high when it is heated.

If the thickness of the Sn layer 23 is less than 0.1 μm, the solder wettability may be deteriorated; if the thickness exceeds 3.0 μm, the thermal stress inside the plating film 20 may be increased when it is heated.

The Mg concentration in the plating film 20 formed of the above-mentioned layer structure is not more than 10% (not less than 0%) of the bulk Mg concentration of the copper alloy plate 10.

If the average concentration of Mg in the plating film 20 exceeds 10% of the bulk Mg concentration in the copper alloy plate 10, Mg in the plating film diffuses to a plating film surface 20a and the solder wettability may be reduced. The average concentration of Mg in the plating film 20 is preferably not more than 5% of the bulk Mg concentration in the copper alloy plate 10; more preferably, not more than 3%.

[Manufacturing Method]

A method of manufacturing the plating film-attached copper alloy plate 1 structured as above will be explained.

The plating film-attached copper alloy plate 1 is manufactured by manufacturing a copper alloy mother plate having a component composition containing 0.3 to 1.2 mass % of Mg, 0.001 to 0.2 mass % of P, and the balance Cu and inevitable impurities (a step of manufacturing a copper alloy mother plate); manufacturing a copper alloy plate by performing a surface treatment on the copper alloy mother plate (a step of surface treatment); then, plating (a step of plating); and reflowing (a step of reflowing).

(Step of Manufacturing Copper Alloy Mother Plate)

The copper alloy mother plate is manufactured by making a copper alloy ingot by melting and casting material compounded in the component composition in the above-mentioned range, and performing a step involving hot rolling, cold rolling, continuous annealing, and finish cold rolling on the copper alloy ingot in this order. In this embodiment, a plate thickness of the copper alloy mother plate is 0.2 mm.

(Step of Surface Treatment)

Surface treatment is performed on the obtained copper alloy mother plate. This surface treatment has an Mg condense treatment diffusing Mg in the copper alloy mother plate toward a surface of the copper alloy mother plate, so as to generate concentration gradient of Mg in the plate thickness direction and to condense Mg on a surface part of the copper alloy mother plate and form an Mg condensed part, and a surface part remove treatment removing the Mg condensed part.

For the Mg condense treatment, the copper alloy mother plate is heated under oxidizing atmosphere such as oxygen, ozone, or the like at a prescribed temperature for a prescribed time. In this case, it is sufficient to perform the heat treatment at the heating temperature not less than 100° C. within heating time in which recrystallization does not occur; it may be performed at any temperature considering an equipment restriction, economical efficiency, and the like. For example, at 300° C. for one minute, at 250° C. for two hours, at 200° C. for five hours or the like; a long time is for low temperature, and a short time is enough for high temperature.

Concentration of oxidizer in the oxidization atmosphere is 5 to 4000 ppm for ozone; preferably 10 to 2000 ppm; more preferably 20 to 1000 ppm. In a case in which ozone is not used but oxygen is used, it is preferable that the atmosphere concentration be two times or more than that in a case of using ozone only. Oxidizer such as ozone and the like and oxygen may be mixed for use. Before the condense treatment of Mg, treatments introducing strains or pores by mechanical polishing or the like to advance diffusion of Mg may be performed.

As the surface part remove treatment, chemical polishing, electrolytic polishing, mechanical polishing and the like can be performed singly or in combination.

Selective etching or the like can be used for the chemical polishing. For the selective etching, for example, etching using nonionic surfactant, heterocyclic compound having a carbonyl group or a carboxyl group, acidic or alkaline liquid containing component which can restrict corrosion of copper such as imidazole compound, triazole compound, tetrazole compound or the like can be used.

For the electrolytic polishing, for example, using acidic or alkaline liquid as electrolytic solution, etching preceding the crystal boundaries by electrolysis on component which is easily segregated at the crystal boundaries of copper can be used.

For the mechanical polishing, various methods generally used such as blast treatment, wrapping treatment, polishing treatment, buffing, grinder polishing, sand-pater polishing, and the like can be used.

As described above, the copper alloy plate 10 is formed by performing the Mg condense treatment and the surface part remove treatment on the copper alloy mother plate. That is, in the copper alloy plate 10, as above-mentioned, the Mg concentration in the surface layer part 11 is lower than the bulk Mg concentration; and the Mg concentration is increased from the copper alloy plate 10 toward the center in the plate thickness direction with the prescribed concentration gradient. The bulk Mg concentration in the copper alloy plate 10 is substantially the same as the Mg concentration (the bulk Mg concentration) in the thickness center part of the copper alloy mother plate.

(Step of Plating Treatment)

Next, a plating treatment is performed to form the plating film 20 on the plate surface 10a of the copper alloy plate 10. Dirt and natural oxide film are removed by performing treatments of degreasing, pickling, and the like on the plate surface 10a of the copper alloy plate 10; then on that, a Cu plating layer is formed by performing a Cu plating treatment; and next, a Sn plating layer is formed by performing Sn plating treatment on a surface of the Cu plating layer.

The Cu plating and the Sn plating layer are desirably plating layers of pure copper and pure tin respectively; however, they may be a Cu alloy plating layer and an Sn alloy plating layer containing the other elements if they are in a range in which the functions and effects of the present invention are not spoiled.

The plating layers are formed by electroplating at 0.1 A/dm$^2$ to 60 A/dm$^2$ inclusive of current density. If the current density of the electroplating is less than 0.1 A/dm$^2$, a rate of forming film is slow and it is not economic. If the current density exceeds 60 A/dm$^2$, it exceeds diffusion-limited current density; and a film cannot be formed without defects.

Table 1 shows an example of Cu or Cu alloy plating; Table 2 shows an example of Sn or Sn alloy plating.

TABLE 1

| Cu Plating Condition | |
| --- | --- |
| Treatment Method | Electroplating |
| Plating Solution | Copper Sulfate Plating Solution |
| Solution Temperature | 27° C. |
| Current Density | 4 A/d m$^2$ |

TABLE 2

| Sn Plating Condition | |
| --- | --- |
| Treatment Method | Electroplating |
| Plating Solution | Tin Sulfate Plating Solution |
| Solution Temperature | 20° C. |
| Current Density | 2 A/d m$^2$ |

(Step of Reflowing Treatment)

Next, on the copper alloy plate 10 on which these plating layers are formed, a reflowing treatment is performed by holding at heating peak temperature 230° C. to 330° C. inclusive for 0.5 second to 30 second inclusive, then cooling to temperature not higher than 60° C.

By performing the reflowing treatment, the plating film 20 formed from the Cu layer 21 with a thickness 0 μm to 1 μm, the Sn—Cu alloy layer 22 with a thickness 0.1 μm to 1.5 μm and the Sn layer 23 with a thickness 0.1 μm to 3.0 μm in order is formed on the plate surface 10a of the copper alloy plate 10. Note that, there is a case in which the Cu layer 21 is not formed in this reflow treatment if all of Cu in the Cu plating layer is alloyed with Sn in the Sn plating layer.

By the reflowing treatment, not only that a part of Cu in the plate surface 10a of the copper alloy plate 10 is diffused into the plating film 20 and alloyed with Sn forming the plating film 20 so that the Sn—Cu alloy layer 22 is formed, but there is a possibility in that Mg in the copper alloy plate 10 is also diffused into the plating film 20 and introduced into the Sn—Cu alloy layer 22 and the Sn layer 23. However, since the Mg concentration in the plate surface 10a of the copper alloy plate 10 is low, Mg taken into the plating film 20 is also minute, and Mg can be prevented from diffusing into the plating film surface 20a effectively.

Since there is remarkably few Mg on the plate surface 10a of the copper alloy plate 10, the surface oxide is also few; even if there is oxide, it can be easily removed by normal cleaning or the like before the plating treatment. Accordingly, the adhesiveness of the plating film 20 and the copper alloy plate 10 in the plating film-attached copper alloy plate 1 is excellent. Oxidized Mg is not easily generated on the plating film surface 20a, so that the plating film-attached copper alloy plate 1 is excellent also in the solder wettability.

In the above-described embodiment, the plating film 20 structured by the Cu layer 21, the Sn—Cu alloy layer 22 and the Sn layer 23 in order is formed on the copper alloy plate 10; however, the plating film is not limited to this, it may be structured from one or more layers selected from tin, copper, zinc, nickel, gold, silver, palladium, and alloy of them.

EXAMPLES

Example 1

Preparing a copper alloy ingot containing 0.3 mass % to 1.2 mass % (inclusive) of Mg, 0.001 mass % to 0.2 mass % (inclusive) of P, and the balance Cu and inevitable impurities, copper alloy mother plates which were respectively different in the Mg concentration were manufactured by normal methods of heat rolling, intermediate annealing, cold rolling, and the like.

Next, Mg condense treatment was performed on the respective copper alloy mother plates by heating under oxidizing atmosphere with different conditions in ranges of heating temperature 200 to 300° C. and heating time one minute to five hours; then, the surface part remove treatment was performed, so that the copper alloy plates were manufactured to have different Mg concentration gradients in the surface layer parts.

On the respective copper alloy plates, any one of polishing treatments described below was performed as the surface part remove treatment.

Physical polishing: buff polishing

Chemical polishing: immersing in polishing solution of mixed water solution of sulfuric acid and hydrogen peroxide added with polyoxyethilenedodecyl ether.

Electrolytic polishing: energizing in aqueous phosphoric acid using SUS304 as a counter electrode As a comparative example, a sample of copper alloy mother plate in which the Mg condense treatment and the surface part remove treatment were not performed was manufactured.

The Mg concentration was measured at the plate surface and several parts in the plate thickness direction of the copper alloy mother plates and the copper alloy plates. The change of the Mg concentration in the plate thickness direction of the respective copper alloy plates was measured from concentration profiles in a depth direction in X-ray photoelectron spectroscopy (XPS). Measuring conditions of XPS is described below.
(Measuring Condition)

Pretreatment: Immersed in acetone solvent, pretreatment is performed using an ultrasonic cleaning machine at 38 kHz for five minutes.
Apparatus: ULVAC PHI X-ray photoelectron spectrometric analysis device PHI5000 VersaProbe
Sputtering Rate: 100 Å/min
Sputtering Time: 100 minutes The depth in the above-described XPS is a depth in terms of $SiO_2$; therefore, the depth in terms of $SiO_2$ in the concentration profile in the XPS depth direction was converted to an actual depth by comparing with data measured by TEM-ED (Energy Dispersive X-ray Spectroscopy) from a sectional direction.

The bulk Mg concentration of the copper alloy mother plates was obtained by collecting a sample in the thickness center part in which the Mg concentration was stable, measuring the maximum value and the minimum value with high-frequency inductively coupled plasma emission spectral analysis (ICP-AES Inductively Coupled Plasma-Atomic Emission Spectrometry), and obtaining arithmetical mean value. Here, the bulk Mg concentration of the copper alloy plates is regarded to be the same as the bulk Mg concentration of the copper alloy mother plates.

Next, after removing the dirt and the natural oxide film by performing treatments of degreasing, pickling and the like on the copper alloy plates, the Cu plating layer was formed with the Cu plating condition shown in Table 1, and then the Sn plating layer was formed with the Sn plating condition shown in Table 2, and the plating film-attached copper alloy plates were formed by reflowing the copper alloy plates on which these plating layers were formed.

For the reflowing treatment, the plating layers were heated to temperature in a range of 230° C. to 330° C. (inclusive) and then cooled to temperature of 60° C. or less.

Samples were taken from the plating film-attached copper alloy plates and Mg concentration in the plating film was measured. Measurement of the Mg concentration to the plating film was obtained from the concentration profile in the depth direction from the surface of the plating film by XPS, as in the case in the above-described copper alloy plates.

Solder wettability on the surface of the plating film and adhesiveness of the plating film to the copper alloy were measured with respect to the samples of the plating film-attached copper alloy plates.

With respect to unprocessed material of the copper alloy plates (the copper alloy plates on which the plating films were not formed after performing the Mg condense treatment and the surface part remove treatment), the solder wettability on the plate surface and surface hardness were measured.

Regarding the solder wettability, according to the solderability testing by JIS-00053 (the balance method), using the solder checker 5200TN by RHESKA Co., LTD., by the conditions of flux applying and soldering described below, the wettability between the samples and the lead-free solder was evaluated.

(Applying Flux)
Flux: 25% rosin-ethanol
Flux temperature: Room temperature (25° C.)
Flux depth: 8 mm
Flux immersion time: five seconds
Drain off method: removing flux by putting an edge on a filter paper for five seconds and holding with fixing on equipment for 30 seconds
(Soldering)
Composition of solder: Sn-3.0% Ag-0.5% Cu made by SENJU METAL INDUSTRY CO., LTD.
Solder temperature: 240° C.
Solder immersion speed: 10±2.5 mm/second
Solder immersion depth: 2 mm
Solder immersion time: 10 seconds From the obtained curved line of load/time, time from starting immersion to when buoyant force by surface tension was zero (i.e., a contact angle of the solder and the sample was 90°) was zero cross time (second). The solder wettability was evaluated "A" (good) if the zero cross time was less than 2 seconds; "B" (acceptable) if it was not less than two seconds and less than four seconds; and "C" (not acceptable) if it was not less than four seconds.

The adhesiveness was evaluated on the samples which was heated at 120° C. for 1000 hours, by a cross cut test. Scratches were made on the samples by a cutter knife to form 100 grids of 1 mm square; cellophane tape (#405 made by NICHIBAN Co., Ltd.) was pressed on the grids by finger pressure; after the cellophane tape was torn off, it was "A" if the plating film was not peeled off, "B" if the three or less of the grids were peeled off, and "C" if four or more were peeled off.

With respect to the surface hardness of the unprocessed material (the copper alloy plate) on which the plating film was not formed was measured, hardness was measured at a load 0.5 gf and 10 gf using the Vickers hardness meter; it was defined "A" (good) if the hardness measured at the load 0.5 gf was 80% or more of the hardness measured at the load 10 gf, and it was defined "C" (not acceptable) if it was less than 80%.

The evaluation results of the samples of the respective bare materials (the copper alloy plates) are shown in Tables 3 to 7 and the evaluation results of the samples of the respective plating film-attached copper alloy plates are shown in Table 8 to 12, for each bulk Mg concentration, respectively.

In either table, the bulk Mg concentration is the Mg concentration (mass %) at the center of the thickness; the surface Mg concentration is the Mg concentration at the plate surface of the copper alloy plate in the step in that the surface part removing treatment is performed, where the unit is %; the ratio to bulk concentration is a ratio of the surface Mg concentration to the bulk Mg concentration, where the unit is %; the surface layer part thickness is a thickness from the plate surface of the copper alloy plate to where the Mg concentration first reaches 90% of the bulk Mg concentration, the unit is μm; and the concentration gradient is gradient of Mg concentration in the surface layer part, the unit is mass %/μm.

The surface layer part thickness and the concentration gradient are calculated from the concentration profile of the Mg component in the depth direction by XPS. FIG. 2 is an example of that profile: that is the sample in Table 5, with 0.7 mass % of the bulk Mg concentration and the sample of 6.3 mass %/μm of the concentration gradient. The samples in to Tables 3 to 7 including this example were adjusted so that the surface Mg concentration substantially be 0%. The concentration gradient means a slope of a straight line connecting a point of the surface Mg concentration and a point where it reaches 90% of the bulk Mg concentration first.

That is, in the concentration profile in the depth direction, in a case in which the change of the Mg concentration from the plate surface to the point where it first reaches 90% of the bulk Mg concentration can be regarded as a straight line having substantially a constant slope even if there is a topical change, the slope of the profile is defined as the concentration gradient.

The unit of the thickness of the Cu plating layer is μm in Tables 8 to 12; in samples on which the Cu plating treatment was not performed but only the Sn plating treatment was performed, the thickness of the Cu plating layer is denoted "0". The thickness of the Sn plating layer was 1.0 μm for all the samples shown in Tables 8 to 12.

TABLE 3

| Bulk Mg Concentration 0.3 (mass %) | | | | | | |
|---|---|---|---|---|---|---|
| Concentration Gradient (mass %/μm) | Removal Method (Polishing) | Surface Mg Concentration (mass %) | Ratio to Bulk Concentration [%] | Thickness of Surface Layer Part (μm) | Solder Wettability | Surface Hardness |
| 1.8 | Physical | 0 | 0 | 0.150 | A | A |
|  | Chemical | 0 | 0 |  | A | A |
|  | Electrolytic | 0 | 0 |  | A | A |
| 10 | Physical | 0 | 0 | 0.027 | A | A |
|  | Chemical | 0 | 0 |  | A | A |
|  | Electrolytic | 0 | 0 |  | A | A |
| 17.5 | Physical | 0 | 0 | 0.015 | A | A |
|  | Chemical | 0 | 0 |  | A | A |
|  | Electrolytic | 0 | 0 |  | A | A |
| 30 | Physical | 0 | 0 | 0.009 | A | A |
|  | Chemical | 0 | 0 |  | A | A |
|  | Electrolytic | 0 | 0 |  | A | A |
| 50 | Physical | 0 | 0 | 0.005 | A | A |
|  | Chemical | 0 | 0 |  | A | A |
|  | Electrolytic | 0 | 0 |  | A | A |

TABLE 4

| Bulk Mg Concentration 0.5 (mass %) | | | | | | |
|---|---|---|---|---|---|---|
| Concentration Gradient (mass %/μm) | Removal Method (Polishing) | Surface Mg Concentration (mass %) | Ratio to Bulk Concentration [%] | Thickness of Surface Layer Part (μm) | Solder Wettability | Surface Hardness |
| 1.8 | Physical | 0 | 0 | 0.250 | A | A |
|  | Chemical | 0 | 0 |  | A | A |
|  | Electrolytic | 0 | 0 |  | A | A |
| 10 | Physical | 0 | 0 | 0.045 | A | A |
|  | Chemical | 0 | 0 |  | A | A |
|  | Electrolytic | 0 | 0 |  | A | A |
| 17.5 | Physical | 0 | 0 | 0.026 | A | A |
|  | Chemical | 0 | 0 |  | A | A |
|  | Electrolytic | 0 | 0 |  | A | A |
| 30 | Physical | 0 | 0 | 0.015 | A | A |
|  | Chemical | 0 | 0 |  | A | A |
|  | Electrolytic | 0 | 0 |  | A | A |
| 50 | Physical | 0 | 0 | 0.009 | A | A |
|  | Chemical | 0 | 0 |  | A | A |
|  | Electrolytic | 0 | 0 |  | A | A |

TABLE 5

| Bulk Mg Concentration 0.7 (mass %) | | | | | | |
|---|---|---|---|---|---|---|
| Concentration Gradient (mass %/μm) | Removal Method (Polishing) | Surface Mg Concentration (mass %) | Ratio to Bulk Concentration [%] | Thickness of Surface Layer Part (μm) | Solder Wettability | Surface Hardness |
| 1.8 | Physical | 0 | 0 | 0.350 | A | A |
|  | Chemical | 0 | 0 |  | A | A |
|  | Electrolytic | 0 | 0 |  | A | A |
| 6.3 | Physical | 0 | 0 | 0.100 | A | A |
|  | Chemical | 0 | 0 |  | A | A |
|  | Electrolytic | 0 | 0 |  | A | A |

TABLE 5-continued

| | Bulk Mg Concentration 0.7 (mass %) | | | | | |
|---|---|---|---|---|---|---|
| Concentration Gradient (mass %/μm) | Removal Method (Polishing) | Surface Mg Concentration (mass %) | Ratio to Bulk Concentration [%] | Thickness of Surface Layer Part (μm) | Solder Wettability | Surface Hardness |
| 17.5 | Physical | 0 | 0 | 0.036 | A | A |
| | Chemical | 0 | 0 | | A | A |
| | Electrolytic | 0 | 0 | | A | A |
| 30 | Physical | 0 | 0 | 0.021 | A | A |
| | Chemical | 0 | 0 | | A | A |
| | Electrolytic | 0 | 0 | | A | A |
| 50 | Physical | 0 | 0 | 0.013 | B | A |
| | Chemical | 0 | 0 | | B | A |
| | Electrolytic | 0 | 0 | | B | A |

TABLE 6

| | Bulk Mg Concentration 1.2 (mass %) | | | | | |
|---|---|---|---|---|---|---|
| Concentration Gradient (mass %/μm) | Removal Method (Polishing) | Surface Mg Concentration (mass %) | Ratio to Bulk Concentration [%] | Thickness of Surface Layer Part (μm) | Solder Wettability | Surface Hardness |
| 1.8 | Physical | 0 | 0 | 0.600 | A | A |
| | Chemical | 0 | 0 | | A | A |
| | Electrolytic | 0 | 0 | | A | A |
| 10 | Physical | 0 | 0 | 0.108 | A | A |
| | Chemical | 0 | 0 | | A | A |
| | Electrolytic | 0 | 0 | | A | A |
| 17.5 | Physical | 0 | 0 | 0.062 | A | A |
| | Chemical | 0 | 0 | | A | A |
| | Electrolytic | 0 | 0 | | A | A |
| 30 | Physical | 0 | 0 | 0.036 | B | A |
| | Chemical | 0 | 0 | | B | A |
| | Electrolytic | 0 | 0 | | B | A |
| 50 | Physical | 0 | 0 | 0.022 | B | A |
| | Chemical | 0 | 0 | | B | A |
| | Electrolytic | 0 | 0 | | B | A |

TABLE 7

| | Bulk Mg Concentration 0.3 (mass %) | | | | | |
|---|---|---|---|---|---|---|
| Concentration Gradient (mass %/μm) | Removal Method (Polishing) | Surface Mg Concentration (mass %) | Ratio to Bulk Concentration [%] | Thickness of Surface Layer Part (μm) | Solder Wettability | Surface Hardness |
| ∞ (Unprocessed) | — | 0.3 | 100 | — | C | A |
| 1 | Physical | 0 | 0 | 0.270 | A | C |
| | Chemical | | | | A | C |
| | Electrolytic | | | | A | C |
| 95 | Physical | 0 | 0 | 0.003 | C | A |
| | Chemical | | | | C | A |
| | Electrolytic | | | | C | A |

TABLE 8

| | Bulk Mg Concentration 0.3 (mass %) | | | | | | |
|---|---|---|---|---|---|---|---|
| Concentration Gradient (mass %/μm) | Removal Method (Polishing) | Surface Mg Concentration (mass %) | Ratio to Bulk Concentration [%] | Thickness of Surface Layer Part (μm) | Thickness of Cu plating layer (μm) | Adhesiveness | Solder Wettability |
| 1.8 | Physical | 0.06 | 20.0 | 0.117 | 0 | A | A |
| | | | | | 1.0 | A | A |
| | Chemical | 0.026 | 8.7 | 0.136 | 0 | A | A |
| | | | | | 1.0 | A | A |
| | Electrolytic | 0.073 | 24.3 | 0.109 | 0 | A | A |
| | | | | | 1.0 | A | A |

TABLE 8-continued

| | | Bulk Mg Concentration 0.3 (mass %) | | | | | |
|---|---|---|---|---|---|---|---|
| Concentration Gradient (mass %/μm) | Removal Method (Polishing) | Surface Mg Concentration (mass %) | Ratio to Bulk Concentration [%] | Thickness of Surface Layer Part (μm) | Thickness of Cu plating layer (μm) | Adhesiveness | Solder Wettability |
| 10 | Physical | 0.046 | 15.3 | 0.022 | 0 | A | A |
| | | | | | 1.0 | A | A |
| | Chemical | 0.044 | 14.7 | 0.023 | 0 | A | A |
| | | | | | 1.0 | A | A |
| | Electrolytic | 0.036 | 12.0 | 0.023 | 0 | A | A |
| | | | | | 1.0 | A | A |
| 17.5 | Physical | 0.018 | 6.0 | 0.014 | 0 | A | A |
| | | | | | 1.0 | A | A |
| | Chemical | 0.036 | 12.0 | 0.013 | 0 | A | A |
| | | | | | 1.0 | A | A |
| | Electrolytic | 0.089 | 29.7 | 0.010 | 0 | A | A |
| | | | | | 1.0 | A | A |
| 30 | Physical | 0.004 | 1.3 | 0.009 | 0 | A | A |
| | | | | | 1.0 | A | A |
| | Chemical | 0.047 | 15.7 | 0.007 | 0 | A | A |
| | | | | | 1.0 | A | A |
| | Electrolytic | 0 | 0.0 | 0.009 | 0 | A | A |
| | | | | | 1.0 | A | A |
| 50 | Physical | 0.007 | 2.3 | 0.005 | 0 | A | A |
| | | | | | 1.0 | A | A |
| | Chemical | 0.032 | 10.7 | 0.005 | 0 | A | A |
| | | | | | 1.0 | A | A |
| | Electrolytic | 0.078 | 26.0 | 0.004 | 0 | A | A |
| | | | | | 1.0 | A | A |

TABLE 9

| | | Bulk Mg Concentration 0.5 (mass %) | | | | | |
|---|---|---|---|---|---|---|---|
| Concentration Gradient (mass %/μm) | Removal Method (Polishing) | Surface Mg Concentration (mass %) | Ratio to Bulk Concentration [%] | Thickness of Surface Layer Part (μm) | Thickness of Cu plating layer (μm) | Adhesiveness | Solder Wettability |
| 1.8 | Physical | 0.063 | 12.6 | 0.215 | 0 | A | A |
| | | | | | 1.0 | A | A |
| | Chemical | 0.08 | 16.0 | 0.206 | 0 | A | A |
| | | | | | 1.0 | A | A |
| | Electrolytic | 0.074 | 14.8 | 0.209 | 0 | A | A |
| | | | | | 1.0 | A | A |
| 10 | Physical | 0.078 | 15.6 | 0.037 | 0 | A | A |
| | | | | | 1.0 | A | A |
| | Chemical | 0.028 | 5.6 | 0.042 | 0 | A | A |
| | | | | | 1.0 | A | A |
| | Electrolytic | 0.082 | 16.4 | 0.037 | 0 | A | A |
| | | | | | 1.0 | A | A |
| 17.5 | Physical | 0.029 | 5.8 | 0.024 | 0 | A | A |
| | | | | | 1.0 | A | A |
| | Chemical | 0.069 | 13.8 | 0.022 | 0 | A | A |
| | | | | | 1.0 | A | A |
| | Electrolytic | 0.076 | 15.2 | 0.021 | 0 | A | A |
| | | | | | 1.0 | A | A |
| 30 | Physical | 0.05 | 10.0 | 0.013 | 0 | A | A |
| | | | | | 1.0 | A | A |
| | Chemical | 0.048 | 9.6 | 0.013 | 0 | A | A |
| | | | | | 1.0 | A | A |
| | Electrolytic | 0.001 | 0.2 | 0.015 | 0 | A | A |
| | | | | | 1.0 | A | A |
| 50 | Physical | 0.003 | 0.6 | 0.009 | 0 | A | A |
| | | | | | 1.0 | A | A |
| | Chemical | 0.002 | 0.4 | 0.009 | 0 | A | A |
| | | | | | 1.0 | A | A |
| | Electrolytic | 0.04 | 8.0 | 0.008 | 0 | A | A |
| | | | | | 1.0 | A | A |

TABLE 10

| Bulk Mg Concentration 0.7 (mass %) | | | | | | | |
|---|---|---|---|---|---|---|---|
| Concentration Gradient (mass %/μm) | Removal Method (Polishing) | Surface Mg Concentration (mass %) | Ratio to Bulk Concentration [%] | Thickness of Surface Layer Part (μm) | Thickness of Cu plating layer (μm) | Adhesiveness | Solder Wettability |
| 1.8 | Physical | 0.033 | 4.7 | 0.332 | 0 | A | A |
|  |  |  |  |  | 1.0 | A | A |
|  | Chemical | 0.027 | 3.9 | 0.335 | 0 | A | A |
|  |  |  |  |  | 1.0 | A | A |
|  | Electrolytic | 0.018 | 2.6 | 0.340 | 0 | A | A |
|  |  |  |  |  | 1.0 | A | A |
| 10 | Physical | 0.008 | 1.1 | 0.062 | 0 | A | A |
|  |  |  |  |  | 1.0 | A | A |
|  | Chemical | 0.004 | 0.6 | 0.063 | 0 | A | A |
|  |  |  |  |  | 1.0 | A | A |
|  | Electrolytic | 0.025 | 3.6 | 0.061 | 0 | A | A |
|  |  |  |  |  | 1.0 | A | A |
| 17.5 | Physical | 0.085 | 12.1 | 0.031 | 0 | A | A |
|  |  |  |  |  | 1.0 | A | A |
|  | Chemical | 0 | 0.0 | 0.036 | 0 | A | A |
|  |  |  |  |  | 1.0 | A | A |
|  | Electrolytic | 0.085 | 12.1 | 0.031 | 0 | A | A |
|  |  |  |  |  | 1.0 | A | A |
| 30 | Physical | 0.09 | 12.9 | 0.018 | 0 | A | A |
|  |  |  |  |  | 1.0 | A | A |
|  | Chemical | 0.011 | 1.6 | 0.021 | 0 | A | A |
|  |  |  |  |  | 1.0 | A | A |
|  | Electrolytic | 0.02 | 2.9 | 0.020 | 0 | A | A |
|  |  |  |  |  | 1.0 | A | A |
| 50 | Physical | 0.054 | 7.7 | 0.012 | 0 | B | A |
|  |  |  |  |  | 1.0 | A | A |
|  | Chemical | 0.026 | 3.7 | 0.012 | 0 | B | A |
|  |  |  |  |  | 1.0 | A | A |
|  | Electrolytic | 0.057 | 8.1 | 0.011 | 0 | B | A |
|  |  |  |  |  | 1.0 | A | A |

TABLE 11

| Bulk Mg Concentration 1.2 (mass %) | | | | | | | |
|---|---|---|---|---|---|---|---|
| Concentration Gradient (mass %/μm) | Removal Method (Polishing) | Surface Mg Concentration (mass %) | Ratio to Bulk Concentration [%] | Thickness of Surface Layer Part (μm) | Thickness of Cu plating layer (μm) | Adhesiveness | Solder Wettability |
| 1.8 | Physical | 0.08 | 6.7 | 0.556 | 0 | A | A |
|  |  |  |  |  | 1.0 | A | A |
|  | Chemical | 0.056 | 4.7 | 0.569 | 0 | A | A |
|  |  |  |  |  | 1.0 | A | A |
|  | Electrolytic | 0 | 0.0 | 0.600 | 0 | A | A |
|  |  |  |  |  | 1.0 | A | A |
| 10 | Physical | 0.034 | 2.8 | 0.105 | 0 | A | A |
|  |  |  |  |  | 1.0 | A | A |
|  | Chemical | 0.007 | 0.6 | 0.107 | 0 | A | A |
|  |  |  |  |  | 1.0 | A | A |
|  | Electrolytic | 0.06 | 5.0 | 0.102 | 0 | A | A |
|  |  |  |  |  | 1.0 | A | A |
| 17.5 | Physical | 0.012 | 1.0 | 0.061 | 0 | A | A |
|  |  |  |  |  | 1.0 | A | A |
|  | Chemical | 0.043 | 3.6 | 0.059 | 0 | A | A |
|  |  |  |  |  | 1.0 | A | A |
|  | Electrolytic | 0.019 | 1.6 | 0.061 | 0 | A | A |
|  |  |  |  |  | 1.0 | A | A |
| 30 | Physical | 0.071 | 5.9 | 0.034 | 0 | B | A |
|  |  |  |  |  | 1.0 | A | A |
|  | Chemical | 0.027 | 2.3 | 0.035 | 0 | B | A |
|  |  |  |  |  | 1.0 | A | A |
|  | Electrolytic | 0.032 | 2.7 | 0.035 | 0 | B | A |
|  |  |  |  |  | 1.0 | A | A |
| 50 | Physical | 0.033 | 2.8 | 0.021 | 0 | B | B |
|  |  |  |  |  | 1.0 | A | A |
|  | Chemical | 0.074 | 6.2 | 0.020 | 0 | B | B |
|  |  |  |  |  | 1.0 | A | A |
|  | Electrolytic | 0.051 | 4.3 | 0.021 | 0 | B | B |
|  |  |  |  |  | 1.0 | A | A |

TABLE 12

| Concentration Gradient (mass %/μm) | Remove Method (Polishing) | Surface Mg Concentration (mass %) | Ratio to Bulk Concentration [%] | Thickness of Surface Layer Part (μm) | Thickness of Cu plating layer (μm) | Adhesiveness | Solder Wettability |
|---|---|---|---|---|---|---|---|
| ∞ (unprocessed) | — | 0.3 | 100 | — | 0 | C | C |
| | | | | | 1.0 | C | A |
| 95 | Physical | 0.05 | 16.7 | 0.002 | 0 | C | C |
| | | | | | 1.0 | C | A |
| | Chemical | 0.1 | 33.3 | 0.002 | 0 | C | C |
| | | | | | 1.0 | C | C |
| | Electrolytic | 0.01 | 3.3 | 0.003 | 0 | C | C |
| | | | | | 1.0 | C | A |

With respect to the bare materials of the copper alloy plates shown in Tables 3 to 7, the solder wettability was poor in Comparative Example (the sample in which the column "concentration gradient" is "∞ (unprocessed) shown in Table 7) on which the Mg condense treatment and the surface part remove treatment were not performed and the one (the sample in which the "concentration gradient" was 95 mass %/μm shown in Table 7) in which the Mg concentration gradient exceeded 50 mass %/μm. Regarding the surface hardness, in the material in which the bulk Mg concentration of the copper alloy mother plate was 0.3 mass %, the one (the sample in which "concentration gradient" was 1 mass %/μm shown in Table 7) in which the Mg concentration gradient was less than 1.8 mass %/μm, the hardness was remarkably deteriorated on the plate surface.

Regarding the plating film-attached copper alloy plates shown in Tables 8 to 12, in the one on which the Mg condense treatment and the surface part remove treatment were not performed (the sample in which "concentration gradient" is "∞ (unprocessed) shown in Table 12) and the ones in which the Mg concentration gradient exceeds 50 mass %/μm (the samples in which "concentration gradient" is 95 mass %/μm shown in Table 12), the adhesiveness was poor when the soldering film was formed.

Example 2

After manufacturing copper alloy plates having various concentration gradient from a copper alloy mother plate with the bulk Mg concentration of 1.2 mass % by the same method as in Example 1, plating film-attached copper alloy plates were formed by plating treatment on the copper alloy plates by the same method as in Example 1; and the Mg concentration in an Sn plating layer in the plating film-attached copper alloy plates was measured with the same condition as in Example 1 by XPS. Then, the ratio of the Mg concentration in the Sn plating layer of the plating film-attached copper alloy plates to the bulk Mg concentration (the ratio to the bulk Mg concentration) and the solder wettability were examined. The results are shown in Table 13.

TABLE 13

| Bulk Mg Concentration (mass %) | Thickness of Cu Plating Layer (μm) | Concentration Gradient (mass %/μm) | Ratio to Bulk Concentration of Mg Concentration in Sn Plating Layer [%] | Solder Wettability |
|---|---|---|---|---|
| 1.2 | 1.0 | 1.8 | 0 | A |
| | | 10 | 1.2 | A |
| | | 17.5 | 2.9 | A |
| | | 30 | 5.0 | A |
| | | 50 | 8.9 | A |
| | | 64 | 11.2 | C |
| | | 90 | 15.3 | C |

As shown in Table 13, in the samples in which the concentration gradient exceeded 50 mass %/μm, the Mg concentration in the Sn plating layer exceeded 10% of the ratio to bulk concentration and the solder wettability was deteriorated.

Example 3

By the same method as in Example 1, samples were formed having the bulk Mg concentration 0.3 mass % and the concentration gradient 1.8 mass %/μm. By changing a removed amount of the surface part in the surface part remove treatment for manufacturing, the copper alloy plates had the same concentration gradient but different surface Mg concentration. The plating film-attached copper alloy plates were manufactured by performing the plating treatment on the manufactured copper alloy plates as the same method in Example 1; the plating adhesiveness and the solder wettability of the plating film-attached copper alloy plates were measured. The results are shown in Table 14. "Ratio to bulk concentration" in Table 14 is a ratio of the surface Mg concentration to the bulk Mg concentration, as in Example 1.

TABLE 14

| Bulk Mg Concentration (mass %) | Concentration Gradient (mass %/μm) | Surface Mg Concentration (mass %) | Ratio to Bulk Concentration [%] | Thickness of Cu Plating Layer (μm) | Adhesiveness | Solder Wettability |
|---|---|---|---|---|---|---|
| 0.3 | 1.8 | 0 | 0.0 | 0 | A | A |
| | | | | 1.0 | A | A |
| | | 0.03 | 10.0 | 0 | A | A |
| | | | | 1.0 | A | A |
| | | 0.05 | 16.7 | 0 | A | A |
| | | | | 1.0 | A | A |
| | | 0.1 | 33.3 | 0 | A | C |
| | | | | 1.0 | C | A |
| | | 0.13 | 43.3 | 0 | A | C |
| | | | | 1.0 | C | A |

As shown in Table 14, in the samples in which the surface Mg concentration exceeded 30% of the bulk Mg concentration (the samples in which the ratio to bulk concentration exceeded 30%), the plating adhesiveness and the solder wettability were deteriorated.

Example 4

By the same method as in Example 1, copper alloy plates (bare materials) were manufactured from the copper alloy plate of the bulk Mg concentration of 1.2 mass %, having the various Mg concentration gradient in the surface layer part and the surface Mg concentration was adjusted to 0 mass %; then, only one layer was formed as the metal plating layer. In the present example, performed was only plating; but reflowing was not performed. Sort of metal of the plating layers was Sn, Cu, Zn, Ni, Au, Ag, and Pd. Plating current density was 3 A/dm² and a thickness of the plating film was 1 μm. Any of acidic, neutral, alkaline baths which are generally used can be used for the plating baths. In this example, acidic bath was used for Sn, Cu, Zn, Ni, and Pd; and alkaline bath was used for Au and Ag.

The samples formed by the above-described process were evaluated with the solder wettability and the adhesiveness of the plating film. The evaluation method and judging method are the same as Example 1. The evaluation results are shown in Tables 15 and 16.

TABLE 15

Bulk Mg Concentration 1.2 (mass %)

| Thickness of Surface Layer Part (μm) | Concentration Gradient (mass %/μm) | Removal Method | Solder Type | Adhesiveness | Solder Wettability |
|---|---|---|---|---|---|
| 0.600 | 1.8 | Physical Polishing | Sn | A | A |
| | | | Cu | A | A |
| | | | Zn | A | A |
| | | | Ni | A | A |
| | | | Au | A | A |
| | | | Ag | A | A |
| | | | Pd | A | A |
| 0.022 | 50 | Physical Polishing | Sn | A | A |
| | | | Cu | A | A |
| | | | Zn | A | A |
| | | | Ni | A | A |
| | | | Au | A | A |
| | | | Ag | A | A |
| | | | Pd | A | A |

TABLE 16

Bulk Mg Concentration 1.2 (mass %)

| Thickness of Surface Layer Part (μm) | Concentration Gradient (mass %/μm) | Remove Method | Plating Type | Adhesiveness | Solder Wettability |
|---|---|---|---|---|---|
| — | ∞ (unprocessed) | Physical Polishing | Sn | C | A |
| | | | Cu | C | A |
| | | | Zn | C | A |
| | | | Ni | C | A |
| | | | Au | C | A |
| | | | Ag | C | A |
| | | | Pd | C | A |
| 0.011 | 95 | Physical Polishing | Sn | C | A |
| | | | Cu | C | A |
| | | | Zn | C | A |
| | | | Ni | C | A |
| | | | Au | C | A |
| | | | Ag | C | A |
| | | | Pd | C | A |

As shown in Tables 15 and 16, the solder wettability was good in both Examples shown in Table 15 and Comparative Examples shown in Table 16; however, as shown by Comparative Examples, in the samples in which the Mg concentration gradient exceeds 50 mass %/μm, the plating film was peeled after heating.

The above-described Examples include a plating film formed only from one layer of plating layer (the Sn plating layer); however, it can be the plating film structure formed of a plurality of plating layers; moreover, it may be alloy of various metals by treatments such as heating and the like for the sake of reducing the cost and further improving characteristics and the like.

For example, in a combination of the Cu plating layer and the pure Sn plating layer, if the reflow treatment cannot be performed with some cause of characteristic, there is a case in which unintentional alloy layer is formed chronologically between the pure tin plating layer and the base copper (the copper alloy plate or the Cu plating layer). There is an anxiety that whiskers are generated by a factor of plating internal stress and the like owing to the alloy layer; therefore, the Sn plating layer can be an alloy plating layer of Sn and Cu or Ag in order to reduce the whiskers.

In order to prevent copper in the copper alloy plate from diffusing to the plating layer (e.g., tin) to form alloy, it is possible to form an intermediate layer (e.g., an electrolytic nickel-plating layer) to reduce the diffusion.

INDUSTRIAL APPLICABILITY

In a copper alloy plate, oxidization at a plate surface is reduced and electrical connection reliability and solder wettability can be improved; and moreover, adhesiveness of a plating film and the copper alloy plate and the solder wettability on a surface of the plating film can be improved in a case in which the plating film is formed.

REFERENCE SIGNS LIST

1 Plating film-attached copper alloy plate
10 Copper alloy plate
10a Plate surface
11 Surface layer part
12 Inner plate part
13 Thickness center portion
20 Plating film
20a Plating film surface
21 Cu layer
22 Sn—Cu alloy layer
23 Sn layer

The invention claimed is:

1. A copper alloy plate containing 0.3 mass % or more and 1.2 mass % or less of Mg, 0.001 mass % or more and 0.2 mass % or less of P, and the balance Cu with inevitable impurities in a thickness center portion in a plate thickness direction, wherein
surface Mg concentration on a plate surface is 30% or less of bulk Mg concentration at the thickness center portion; and
in a surface layer part from the plate surface to a depth in which Mg concentration is 90% of the bulk Mg concentration, the Mg concentration increases from the plate surface toward the thickness center portion with a concentration gradient 1.8 mass %/µm or more and 50 mass %/µm or less.

2. The copper alloy plate according to claim 1, wherein a thickness of the surface layer part is 0.6 µm or less.

3. A plating film-attached copper alloy plate further comprising a plating film formed on the surface layer part of the copper alloy plate of the copper alloy plate according to claim 1.

4. The plating film-attached copper alloy plate according to claim 3, wherein average concentration of Mg in the plating film is 10% or less of the bulk Mg concentration.

5. The plating film-attached copper alloy plate according to claim 3, wherein the plating film consists of one or more layers selected from tin, copper, zinc, nickel, gold, silver, palladium, and alloy thereof.

6. A method of manufacturing the copper alloy plate according to claim 1, comprising an Mg condense treatment forming the concentration gradient of Mg in a plate thickness direction and forming an Mg condense part in which Mg is condensed by diffusing Mg in an Mg containing copper alloy plate toward a surface of the Mg containing copper alloy plate and a surface part remove treatment forming the surface layer part by removing the Mg condense part.

7. A method of manufacturing the plating film-attached copper alloy plate according to claim 3, wherein the plating film is formed by electrolytic plating treatment with current density 0.1 A/dm$^2$ or more and 60 A/dm$^2$.

8. The method of manufacturing the plating film-attached copper alloy plate according to claim 7, wherein after the electrolytic plating treatment forming the plating film including tin, reflow treatment is performed with heating peak temperature 230° C. or more and 330° C. or less and heating time at the heating peak temperature is 0.5 seconds or more and 30 seconds or less.

* * * * *